(12) United States Patent
Hashim et al.

(10) Patent No.: US 6,772,545 B2
(45) Date of Patent: Aug. 10, 2004

(54) UNIVERSAL LICENSE PLATE HOLDER

(75) Inventors: Waqar Hashim, Grand Blanc, MI (US); John E Dewit, Grand Blanc, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/282,842

(22) Filed: Oct. 29, 2002

(65) Prior Publication Data

US 2004/0079007 A1 Apr. 29, 2004

(51) Int. Cl.[7] .............................................. G09F 7/00
(52) U.S. Cl. ........................................................ 40/209
(58) Field of Search ........................... 40/200, 209, 211, 40/1, 606.01, 606.03, 606.07, 606.14, 606.15, 606.16, 617, 745, 746, 747

(56) References Cited

U.S. PATENT DOCUMENTS

| | | | | |
|---|---|---|---|---|
| 1,488,098 A | * | 3/1924 | Critharris | 40/204 |
| 1,757,587 A | * | 5/1930 | Quinn | 40/209 |
| 1,778,660 A | * | 10/1930 | Cederberg | 40/209 |
| 2,211,085 A | * | 8/1940 | Thomas | 40/209 |
| 2,244,867 A | * | 6/1941 | Buchanan | 40/200 |
| 2,603,013 A | * | 7/1952 | Sherwood | 40/209 |

* cited by examiner

*Primary Examiner*—Mark T. Le
(74) *Attorney, Agent, or Firm*—Laura C. Hargitt

(57) ABSTRACT

A universal license plate holder which is selectively adjustable to accommodate various sized license plates used around the world, composed of a pair of attachment brackets which are spaced apart and connected to the motor vehicle via respective mounting fasteners and further composed of a cross-bar which is pivotally connected to the attachment brackets. When loosened, each mounting fastener provides a pivot axis for its respective attachment brackets; however, when tightened the attachment brackets are frozen in a fixed relative position. Operatively, rotation of the attachment brackets allows for alignment with the plate holes of any license plate, for example a North American standard license plate, a European standard license plate, a Japanese standard license plate and a Korean standard license plate.

13 Claims, 3 Drawing Sheets

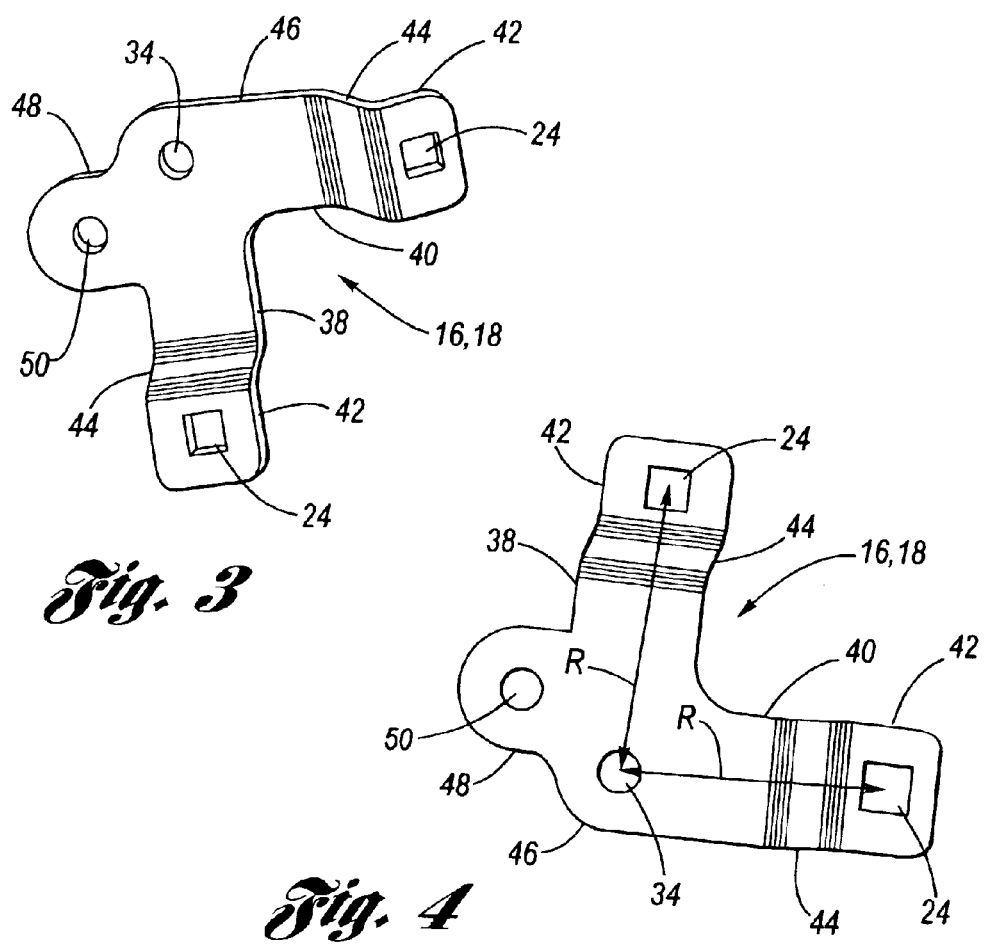
*Fig. 3*
*Fig. 4*
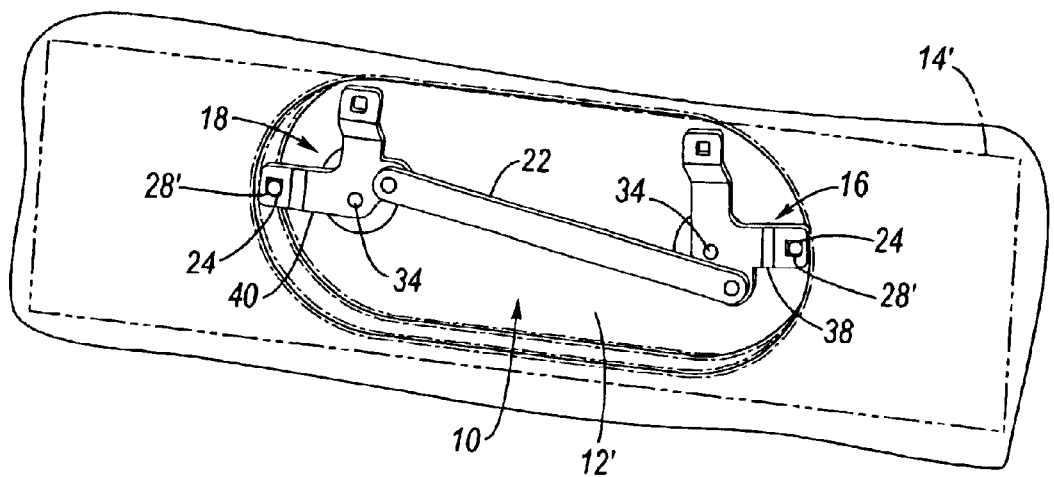
*Fig. 5*

UNIVERSAL LICENSE PLATE HOLDER

TECHNICAL FIELD

The present invention relates to holders used to attach a license plate to a motor vehicle, and more particularly to a universal license plate holder which is selectively adjustable so as to accommodate differing sizes of license plates that are used in various locations around the world.

BACKGROUND OF THE INVENTION

Motor vehicle regulations around the world require that motor vehicles display a license plate indicative of the registration of that vehicle. The usual mounting of the license plate is by threadably fastening the license plate to a bracket attached at the rear of the vehicle, for example at the rear deck lid, lift gate, rear deck panel, or bumper.

License plate size is not universal around the world. There are, for example, different size license plates used in each of North America, Europe, Japan and Korea. Problematically, since automakers ship motor vehicles to a number of countries, the license plate bracket must be correctly chosen to fit the license plate of the country of destination, and this requires an added cost involved in the customization. In this regard, it is presently customary to provide plate mounting holes into the vehicle sheet metal specific to the country of destination of the vehicle, or alternatively, to not provide any holes at the manufacturing facility and default to the dealer the job of drilling the holes (which holes are problematic in that they result in exposed metal edges which are prone to rust initiation). These customary plate mounting hole options involve a cost impact, part number proliferation, sequencing, scheduling and warranty issues, as well as the need to install plastic appliques to hide unused mounting holes.

Accordingly, what is needed in the art is a single license plate holder which can somehow universally accommodate different sized license plates used around the world.

SUMMARY OF THE INVENTION

The present invention is a universal license plate holder which is selectively adjustable to accommodate various sized license plates used around the world.

The universal license plate holder according to the present invention is composed of a pair of attachment brackets which are spaced apart and connected to the motor vehicle via respective mounting fasteners and is further composed of a cross-bar which is pivotally connected to the attachment brackets. When loosened, each mounting fastener provides a pivot axis for its respective attachment bracket; however, when the mounting fasteners are tightened, the attachment brackets are frozen in a fixed relative position.

In operation, the attachment brackets are connected loosely to the motor vehicle via the mounting fasteners so that the mounting brackets are free to rotate therearound. Next, the mounting brackets are rotated in unison due to the interconnection therebetween by the cross-bar so that a plate mounting hole of each of the mounting brackets is aligned with a respective plate hole of a chosen size of license plate. The mounting fasteners are then tightened to affix the orientation of the mounting brackets so that thereafter any license plate of this size is easily attached and/or removed as necessary without readjustment of the mounting brackets.

Accordingly, it is an object of the present invention to provide a universal license plate holder which is selectively adjustable so as to hold a range of differently sized license plates.

This and additional objects, features and advantages of the present invention will become clearer from the following specification of a preferred embodiment.

BRIEF DESCRIPTION OF THE DRAWINGS

FIG. 3 is a perspective view of an attachment bracket according to the present invention.

FIG. 4 is a plan view of an attachment bracket according to the present invention.

FIG. 5 is a plan view of the universal license plate holder according to the present invention, shown in operation with respect to a motor vehicle, wherein the configuration is set for attaching a European standard license plate.

DESCRIPTION OF THE PREFERRED EMBODIMENT

Figure 1:
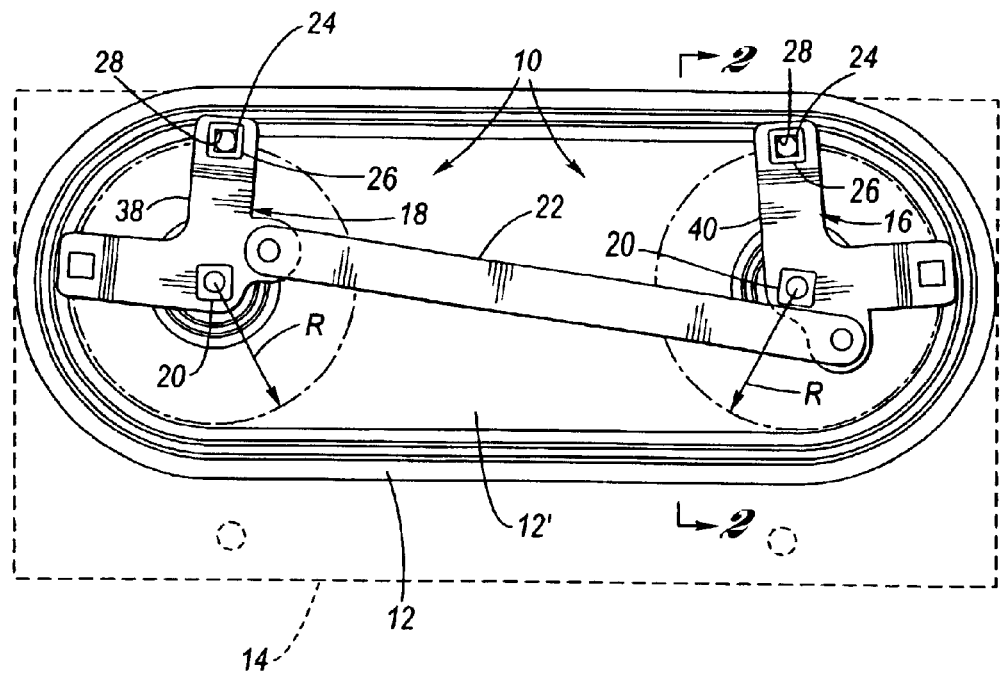
FIG. 1 is a plan view of the universal license plate holder according to the present invention, shown in operation with respect to a motor vehicle, wherein the configuration is set for attaching a North American standard license plate.

Referring now to the Drawing, FIG. 1 depicts a universal license plate holder 10 according to the present invention in operation with respect to a mount location 12 of a motor vehicle (which may be, for example, at the rear deck lid, lift gate, rear deck panel, or bumper, and which may include a depression 12'). The universal license plate holder 10 is exemplarly shown configured to hold a North American standard license plate 14 (shown in phantom).

The universal license plate holder 10 includes first and second attachment brackets 16, 18 which are mutually spaced apart from each other. Each attachment bracket 16, 18 is connected to the motor vehicle via respective mounting fasteners 20 which allow for rotation of its respective attachment bracket thereabout when in a loosened state, but held in fixed position when in a tightened state. A cross-bar 22 is pivotally connected, via respective ends thereof, to each of the attachment brackets 16, 18. The cross-bar 22 interacts with the attachment brackets 16, 18 such that if any one attachment bracket is rotated about its respective mounting fastener, then the other must rotate in unison about its respective mounting fastener.

The attachment brackets 16, 18 each have at least one license plate mounting hole 24. Preferably, this hole is shaped to accept a standard nylon mounting nut 26 of the type well known in the art and commonly used for license plate mounting via a mounting bolt (see 36 in FIG. 2) threading thereinto. In this regard, the attachment brackets 16, 18 are rotated so that the plate mounting holes 24 thereof align with a pair of plate holes 28 of a certain standard size license plate, as for example the upper pair of plate holes of a North American standard license plate 14, as shown at FIG. 1.

Figure 2:
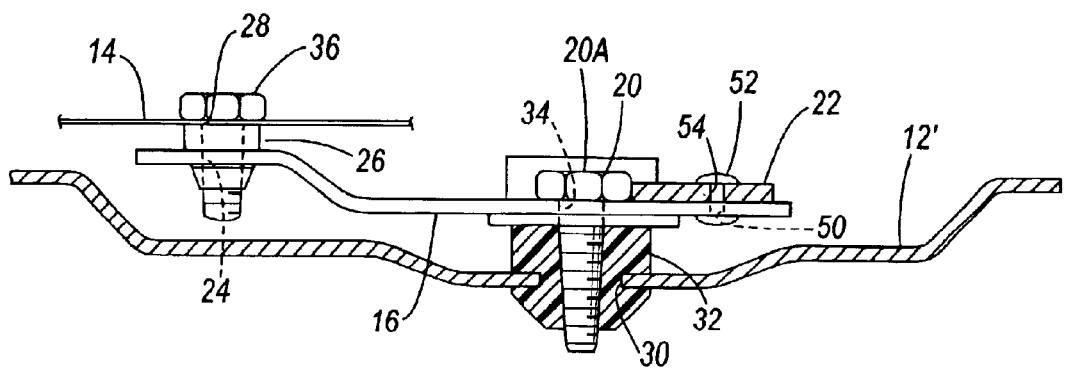
FIG. 2 is a partly sectional view, seen along line 2—2 of FIG. 1.

The foregoing operation of the universal license plate holder 10 and its interface with the rear panel 12 and the license plate 14 can be further comprehended by additional reference to FIG. 2, wherein while only the first attachment bracket 16 is shown the same description applies to the second attachment bracket 18.

It will be seen that the rear panel 12 has an attachment hole 30 (there being provided one such attachment hole for each of the first and second attachment brackets) which is preferably provided at the factory prior to application of metal coatings (for example corrosion inhibiter, primer and paint). By way of example, a nylon attachment nut 32 is press-fit into the attachment hole 30. A mounting fastener 20 in the form of a bolt 20A is passed through a pivot hole 34 of the first attachment bracket 16 and then threaded into the nylon attachment nut 32. A mounting bolt 36 is passed through a plate hole 28, the plate mounting hole 24 and then threaded into the mutually aligned nylon mounting nut 26 of the first attachment bracket 16. The foregoing is repeated for the second attachment bracket 18 so as to thereby mount the license plate 14 onto the universal license plate holder 10.

Referring now additionally to FIGS. 3 and 4, the preferred attachment brackets 16, 18 will be further detailed.

Each attachment bracket 16, 18 has a pair of arms in the form of a first arm 38 and a second arm 40, wherein the second arm is oriented at a right angle to the first arm. Each of the first and second arms 38, 40 have the aforementioned license plate mounting hole 24 located at a distal bracket portion 42. Each distal bracket portion 42 is parallel with, and elevated by a step 44 with respect to, a main bracket portion 46 whereat the pivot hole 34 is located. The distance R (see FIGS. 1 and 4) between the pivot hole 34 and each of the license plate mounting holes 24 is the same for the first and second arms of each attachment bracket 16, 18. Adjoining the first arm 38, a flange 48 protrudes from, and is in parallel relation with, the main bracket portion 46. A cross-bar connection hole 50 is formed therein. As indicated at FIG. 2, the cross-bar 22 is pivotally connected at each end thereof to a respective attachment bracket 16, 18 at the cross-bar connection hole 50 thereof via, for example, a rivet 52 passing through a respective cross-bar hole 54.

By way merely of illustration and not limitation, preferred dimensions for the universal license plate holder 10 will now be given. The distance between the cross-bar holes 54 of the cross-bar 22 is about 182.5 mm. The distance between the pivot holes 34 of the first and second attachment brackets 16, 18 is about 185 mm. The distance between the pivot hole 34 of each of the first and second attachment brackets 16, 18 and the mounting hole 24 of each of the distal bracket portions 42 respectively thereof is about 43 mm. Finally, the distance between the pivot hole 34 of each of the first and second attachment brackets 16, 18 and the cross-bar connection hole 50 of the flange 48 respectively thereof is about 21 mm. attachment brackets 16, 18 is about 185 cm. The distance between the pivot hole 34 of each of the first and second attachment brackets 16, 18 and the mounting hole 24 of each of the distal bracket portions 42 respectively thereof is about 43 cm. Finally, the distance between the pivot hole 34 of each of the first and second attachment brackets 16, 18 and the cross-bar connection hole 50 of the flange 48 respectively thereof is about 21 cm.

In operation, the attachment brackets 16, 18 are connected loosely to the motor vehicle via the mounting fasteners 20 being loosely threaded so that the mounting brackets are free to rotate therearound. Next, the mounting brackets are rotated in unison due to the interconnection therebetween by the cross-bar 22 so that a plate mounting hole 24 of each of the mounting brackets is aligned with a respective plate hole 28 of a chosen size of license plate. The mounting fasteners are then threadingly tightened to affix the orientation of the mounting brackets so that thereafter any license plate of this size is easily attached and/or removed as necessary without readjustment of the mounting brackets.

The foregoing is illustrated by simultaneous reference to FIGS. 1, 5, 6 and 7.

In the operative illustration of FIG. 1, the attachment brackets 16, 18 have been positioned so that the upper pair of plate holes 28 of a North American standard license plate 14 is aligned with the license plate mounting holes 24, wherein utilized is the first arm 38 of the second attachment bracket 18 and the second arm 40 of the first attachment bracket 16. In this particular case, the license plate mounting holes are located a distance apart of about 178 mm.

In the operative illustration of FIG. 5, the attachment brackets 16, 18 have been positioned so that the pair of plate holes 28' of a European standard license plate 14' is aligned with the license plate mounting holes 24, wherein utilized is second arm 40 of the second attachment bracket 18 and the first arm 38 of the first attachment bracket 16. In ibis particular case, the license plate mounting holes are located a distance apart of about 270 mm.

Figure 6:
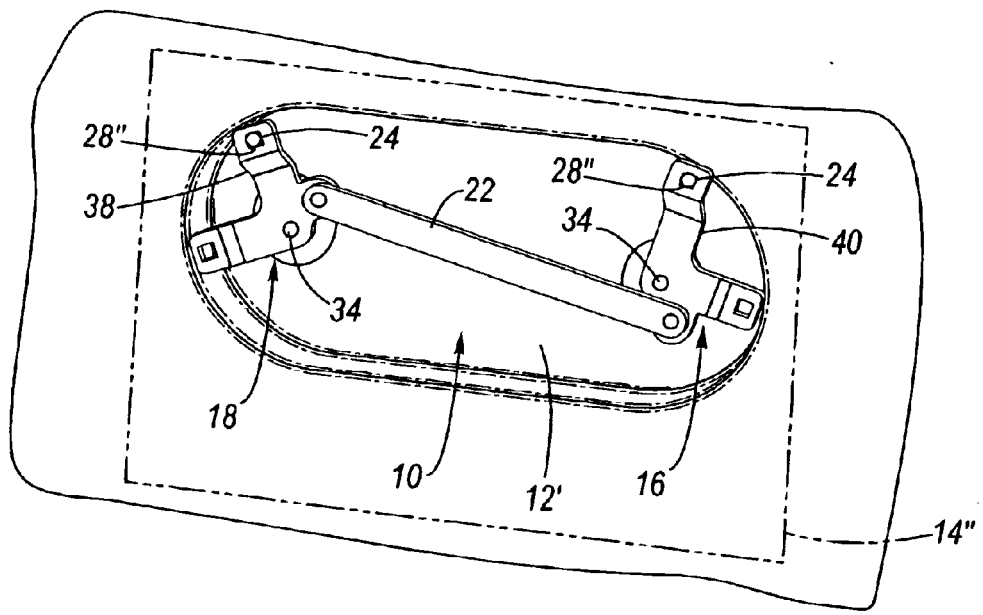
FIG. 6 is a plan view of the universal license plate holder according to the present invention, shown in operation with respect to a motor vehicle, wherein the configuration is set for attaching a Japanese standard license plate.

In the operative illustration of FIG. 6, the attachment brackets 16, 18 have been positioned so that a pair of plate holes 28" of a standard Japanese license plate 14" is aligned with the license plate mounting holes 24, wherein utilized is the first arm 38 of the second attachment bracket 18 and the second arm 40 of the first attachment bracket 16. In this particular case, the license plate mounting holes are located a distance apart of about 210 mm.

Figure 7:
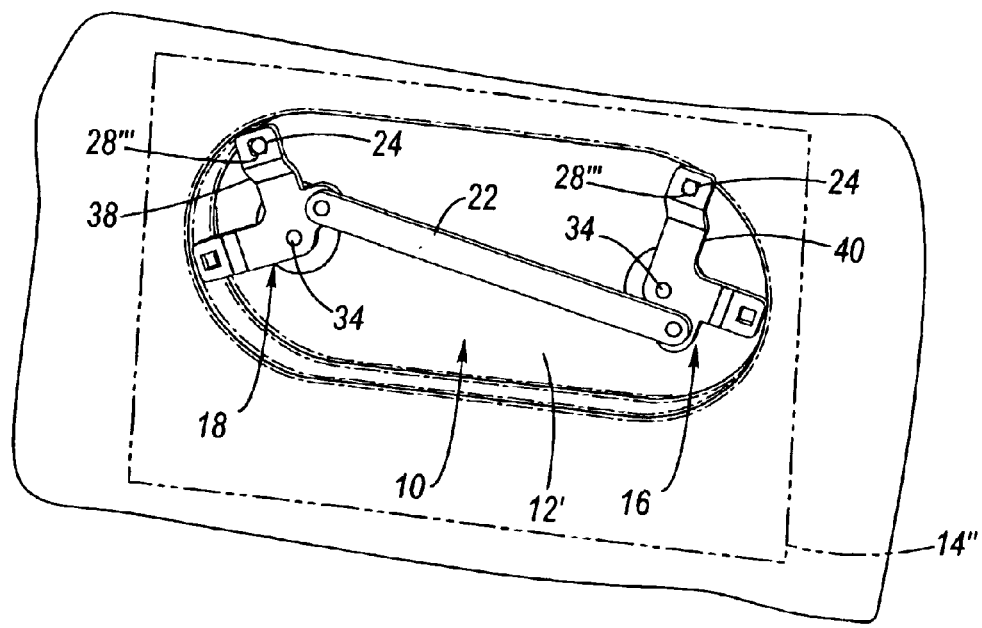
FIG. 7 is a plan view of the universal license plate holder according to the present invention, shown in operation with respect to a motor vehicle, wherein the configuration is set for attaching a Korean standard license plate.

In the operative illustration of FIG. 7, the attachment brackets 16, 18 have been positioned so that a pair of plate holes 28''' of a standard Korean license plate 14''' is aligned with the license plate mounting holes 24, wherein utilized is the first aim 38 of the second attachment bracket 18 and the second arm 40 of the first attachment bracket 16 In this particular case, the license plate mounting holes are located a distance apart of about 205 mm.

It will be noted that as a matter of operational simplification and facility of use of the universal license plate holder 10, the configuration is predetermined such that the attachment brackets 16, 18 were not rotated as between FIGS. 1 and 5. Accordingly, if only North American and European standards are involved, there is no need to reposition the attachment brackets, and yet either size license plate is immediately accommodated and, since readjustment is unnecessary, the cross-bar 22 is obviated.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A universal license plate holder, comprising:
 a first attachment bracket having a first pivot hole;
 a second attachment bracket having a second pivot hole; and
 a cross-bar pivotally connected to each of said first and second attachment brackets, wherein said cross-bar is connected to said first attachment bracket at a location spaced from said first pivot hole, and wherein said cross-bar is connected to said second attachment bracket at a location spaced from said second pivot hole;

wherein each of said first and second attachment brackets has formed therein at least one license plate mounting hole.

2. The universal license plate holder of claim 1, wherein said first and second attachment brackets are substantially identical with respect to each other.

3. The universal license plate holder of claim 2, wherein each of said first and second attachment brackets comprises:
   a main bracket portion whereat said pivot hole is located;
   a first arm connected with said main bracket portion, said first arm having a first arm distal bracket portion; and
   a second arm connected with said main bracket portion, said second arm having a second arm distal bracket portion;
   wherein a said license plate mounting hole is formed at each of said first and second distal end portions.

4. The universal license plate holder of claim 3, wherein each of said first and second attachment brackets further comprises a flange connected to said main bracket portion whereat a respective end of said cross-bar is pivotally connected.

5. The universal license plate holder of claim 4, wherein said first arm is oriented at substantially a right angle with respect to said second arm.

6. The universal license plate holder of claim 5, wherein each of said license plate mounting holes is spaced substantially equally distant with respect to said pivot hole.

7. The universal license plate holder of claim 6, wherein said main bracket portion of each of said first and second attachment brackets is connected to each of said first and second distal bracket portions thereof by a respective step.

8. A universal license plate holder, comprising:
   a first attachment bracket having a first pivot hole;
   a second attachment bracket having a second pivot hole; and
   a cross-bar pivotally connected to each of said first and second attachment brackets, wherein said cross-bar is connected to said first attachment bracket at a location spaced from said first pivot hole, and wherein said cross-bar is connected to said second attachment bracket at a location spaced from said second pivot hole;
   wherein each of said first and second attachment brackets comprises:
      a main bracket portion whereat said pivot hole is located;
      a first arm connected with said main bracket portion, said first arm having a first arm distal bracket portion; and
      a second arm connected with said main bracket portion, said second arm having a second arm distal bracket portion;
      wherein a license plate mounting hole is formed at each of said first and second distal end portions; and
   wherein said first and second attachment brackets are substantially identical with respect to each other.

9. The universal license plate holder of claim 8, wherein said first arm is oriented substantially at a right angle with respect to said second arm.

10. The universal license plate holder of claim 9, wherein each of said license plate mounting holes is spaced substantially equally with respect to said pivot hole.

11. The universal license plate holder of claim 10, wherein said main bracket portion of each of said first and second attachment brackets is connected to each of said first and second distal bracket portions thereof by a respective step.

12. A method of mounting at least one license plate to a motor vehicle, comprising the steps of:
   providing a universal license plate holder comprising a first attachment bracket, a second attachment bracket, and a cross-bar pivotally connected to each of said first and second attachment brackets, wherein said first and second attachment brackets each have at least one license plate mounting hole;
   attaching the first attachment bracket to a license plate mounting area of the motor vehicle, wherein the first attachment bracket is selectively rotatable about a first pivot;
   attaching the second attachment bracket to the license plate mounting area of the motor vehicle, wherein the second attachment bracket is selectively rotatable about a second pivot;
   rotating in unison said first and second attachment brackets respectively about said first and second pivots so as to align a license plate mounting hole of the at least one license plate mounting hole of each of said first and second attachment brackets each with a respective hole of a pair of plate holes of a selected license plate; and
   attaching the selected license plate to the first and second attachment brackets via the aligned license plate attachment holes.

13. The method of claim 12, wherein said step of rotating and attaching comprise the selected license plate being selected from a group comprising a North American standard license plate, a European standard license plate, a Japanese standard license plate and a Korean standard license plate.

* * * * *